(12) United States Patent
Hubinette

(10) Patent No.: US 8,527,343 B1
(45) Date of Patent: Sep. 3, 2013

(54) DISTRIBUTING CONTENT ACROSS MULTIPLE CONTENT LOCATIONS

(75) Inventor: Carl F. Hubinette, Brier, WA (US)

(73) Assignee: Google Inc., Mountain View, CA (US)

( * ) Notice: Subject to any disclaimer, the term of this patent is extended or adjusted under 35 U.S.C. 154(b) by 354 days.

(21) Appl. No.: 12/862,045

(22) Filed: Aug. 24, 2010

(51) Int. Cl.
*G06Q 30/00* (2012.01)

(52) U.S. Cl.
USPC ............ 705/14.42; 705/14.43; 705/6; 705/10

(58) Field of Classification Search
USPC ....................................... 705/14, 14.42, 6, 10
See application file for complete search history.

(56) References Cited

U.S. PATENT DOCUMENTS

| | | | |
|---|---|---|---|
| 2003/0074252 A1* | 4/2003 | Chandler-Pepelnjak et al. | 705/10 |
| 2003/0110080 A1* | 6/2003 | Tsutani et al. | 705/14 |
| 2004/0044571 A1 | 3/2004 | Bronnimann et al. | |
| 2006/0271428 A1 | 11/2006 | Barlow | |
| 2006/0282533 A1* | 12/2006 | Steelberg et al. | 709/224 |
| 2007/0033096 A1* | 2/2007 | Jeong | 705/10 |
| 2007/0038509 A1 | 2/2007 | Jain et al. | |
| 2009/0006145 A1* | 1/2009 | Duggal et al. | 705/6 |
| 2009/0037949 A1 | 2/2009 | Birch | |
| 2009/0106100 A1 | 4/2009 | Mashinsky | |

* cited by examiner

*Primary Examiner* — John G Weiss
*Assistant Examiner* — Eric Netzloff
(74) *Attorney, Agent, or Firm* — Armstrong Teasdale LLP

(57) ABSTRACT

Methods, systems and computer program products are described for optimizing the purchase of ad impressions across multiple content providers. A first candidate value for an effective cost per target user for an advertising campaign that includes providing advertisements on at least a first website and a second website can be identified. A first cost associated with achieving the first candidate value for the effective cost per target user at the first website can be determined. A second cost associated with achieving the first candidate value for the effective cost per target user at the second website can be determined. A total advertising campaign cost can be calculated using the first cost and the second cost. The calculated total advertising campaign cost can be compared to a predetermined advertising campaign budget and a second candidate value for the effective cost per target user can be identified based on the comparing.

22 Claims, 4 Drawing Sheets

DISTRIBUTING CONTENT ACROSS MULTIPLE CONTENT LOCATIONS

TECHNICAL FIELD

This disclosure relates to distributing content.

BACKGROUND

In many different environments, content providers want to distribute content to selected recipients by making the content available in multiple content locations. For example, advertisers who distribute their advertisements to advertisement slots want to make use of advertisement slots where the advertisements will be effective in communicating information to potential customers, and when the advertisements will lead to desired activity, such as a purchase of the advertiser's goods or services. In some instances, an advertising campaign for an advertiser can include multiple content locations (e.g., websites). Ads provided by the advertiser can be presented along with content associated with the content locations that are included in the ad campaign. In some instances, the advertiser can pay the owners of the content locations or an advertising system for each such ad presentation (i.e., ad placement) Advertisers also may select content locations to include in an ad campaign so as to reach potential viewers that are more likely to be interested in products sold by the advertisers. For example, an advertiser may rely on targeting information, such as demographic information of potential viewers, when selecting content locations to include in an ad campaign.

SUMMARY

Methods, systems and computer program products are described for distributing content, such as advertisements, across multiple content locations.

In general, one aspect of the subject matter described in this specification can be embodied in computer-implemented methods that include identifying a first candidate value for an effective cost per target user for an advertising campaign that includes providing advertisements on at least a first website and a second website; determining a first cost associated with achieving the first candidate value for the effective cost per target user at the first website; determining a second cost associated with achieving the first candidate value for the effective cost per target user at the second website; calculating a total advertising campaign cost using the first cost and the second cost; comparing the calculated total advertising campaign cost to a predetermined advertising campaign budget and identifying a second candidate value for the effective cost per target user based on the comparing; repeating the steps of determining the first cost, determining the second cost, calculating the total advertising campaign cost, and comparing the calculated total advertising campaign cost to a predetermined advertising campaign budget until the calculated total advertising campaign cost is a desired total advertising campaign cost; and designating a candidate value for the effective cost per target user that results in the calculated total advertising campaign cost being the desired total advertising campaign cost as a target value for the effective cost per target user.

Implementations can optionally include one or more of the following features. Determining the first cost associated with achieving the first candidate value for the effective cost per target user at the first website can include identifying a cost per impression for the first website; identifying a number of target users associated with the first website; using the cost per impression for the first website and the number of target users associated with the first website to determine a number of impressions to purchase in order to achieve the identified candidate value for the effective cost per target user; and determining the first cost using the determined number of impressions to purchase and the cost per impression for the first website. Determining the number of impressions to purchase can include performing a binary search to identify the number of impressions to purchase to achieve the identified candidate value for the effective cost per target user, using the identified number of target users.

Determining the number of impressions to purchase can include performing an iterative process. The iterative process can include selecting an initial candidate value for the number of impressions to purchase; calculating an interim value for the effective cost per target user using the initial candidate value for the number of impressions to purchase; determining that the interim value for the effective cost per target user is not within a predetermined range of the candidate value for the effective cost per target user; and identifying a second candidate value for the number of impressions to purchase responsive to the determining.

Calculating the interim value for the effective cost per target user can include calculating a number of target users reached for the candidate value for the number of impressions to purchase, using the candidate value for the number of impressions to purchase, the number of target users associated with the first website, and a total number of users associated with the first website. Calculating the number of target users reached for the candidate value for the number of impressions to purchase can include calculating the probability of an individual user seeing at least one impression of a number of impressions equal to the candidate value for the number of impressions to purchase, using the total number of users associated with the first website and the candidate value for the number of impressions to purchase, based on an assumption that each user of the website is equally likely to see a particular advertisement impression, and multiplying the probability by the number of target users associated with the first website.

Calculating the interim value for the effective cost per target user can include identifying a number of target users reached for the candidate value for the number of impressions to purchase using one or more histograms of user behavior. Targeting information to be used in identifying target users from an advertiser can be received. The received targeting information can be used to identify target users for the first website. Identifying the first candidate value for the effective cost per target user can include selecting an arbitrary first candidate value. Identifying the first candidate value for the effective cost per target user can include identifying an average cost per target user for one or more advertising campaigns. The desired total advertising campaign cost can be within a predetermined range of the predetermined advertising campaign budget. Calculating a total advertising campaign cost can include calculating a total advertising campaign cost for an advertising campaign that includes the first website, the second website and one or more additional websites. The target value for the effective cost per target user can be the same for each website included in the advertising campaign.

In another aspect, the subject matter described in this specification can be embodied in computer-implemented methods that include determining an effective cost per target user for users of a plurality of websites such that a total advertising campaign cost for an advertising campaign that includes the plurality of websites is within a predetermined advertising campaign budget range, where the number of target users for each of the plurality of websites is less than the total number of users for the website, and the effective cost per target user is consistent across the plurality of websites; identifying a cost per impression for each of the plurality of websites; and calculating a number of impressions to purchase for each of the plurality of websites using the identified cost per impression for the website and the determined effective cost per target user.

Implementations can optionally include one or more of the following features. Determining the effective cost per target user can include performing a binary search to identify the effective cost per target user. Determining the effective cost per target user can include performing an iterative process. The iterative process can include selecting an initial candidate value for the effective cost per target user; determining an interim number of impressions to purchase for each of the plurality of websites in order to achieve the candidate value for the effective cost per target; calculating the total advertising campaign cost using the interim number of impressions to purchase and the identified cost per impression for each of the plurality of websites; determining that the calculated total advertising campaign cost is not within the predetermined advertising campaign budget range; and identifying a second candidate value for the effective cost per target user responsive to the determining.

Selecting an initial candidate value for the effective cost per target user can include identifying an average cost per target user for one or more advertising campaigns. Calculating the number of impressions to purchase for each of the plurality of websites can include performing a binary search to identify the number of impressions to purchase to achieve the effective cost per target user, given a predetermined number of target users associated with each of the plurality of websites. Calculating the number of impressions to purchase for each of the plurality of websites can include performing an iterative process. The iterative process can include selecting an initial candidate value for the number of impressions to purchase; calculating an interim value for the effective cost per target user using the initial candidate value for the number of impressions to purchase; determining that the interim value for the effective cost per target user is not within a predetermined range of the determined actual effective cost per target user; and identifying a second candidate value for the number of impressions to purchase responsive to the determining. Targeting information can be received from an advertiser. The received targeting information can be used to identify the plurality of websites. The received targeting information can be used to identify the number of target users for each of the plurality of websites.

In another aspect, the subject matter described in this specification can be embodied in computer-implemented methods that include identifying a total number of users of a website for a first time period; determining criteria for identifying target users of the website; identifying a total number of target users for the website, using the determined criteria, for the first time period; identifying a number of advertisement impressions in association with the website; and determining a number of target users reached for the number of advertisement impressions by calculating the probability of an individual user seeing at least one advertisement impression of the identified number of advertisement impressions using the total number of users and the number of advertisement impressions, based on an assumption that each user of the website is equally likely to see a particular advertisement impression, and multiplying the probability by the total number of target users for the website.

Implementations can optionally include one or more of the following features. A cost per impression can be identified in association with the website. The determined number of target users reached, the cost per impression, and the number of advertisement impressions can be used to determine a first effective cost per target user for the number of advertisement impressions. The first effective cost per target user can be compared to a target effective cost per target user. A second number of advertisement impressions can be selected responsive to determining that the first effective cost per target user is not within a specified range of the target effective cost per target user. A number of target users reached for the second number of advertisement impressions can be calculated. The steps of determining an effective cost per target user, comparing the determined effective cost per target user to the target effective cost per target user, selecting a number of advertisement impressions, and calculating a number of target users reached can be performed until the determined effective cost per target user is within the specified range of the target effective cost per target user.

The subject matter described in this specification can potentially provide one or more of the following advantages. Target users for an ad campaign can be identified. The number of target users reached for a given ad campaign budget can be maximized. An effective cost for each target user reached for a given ad campaign budget can be identified. A number of impressions to purchase from each of a plurality of websites included in an ad campaign can be calculated.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

DESCRIPTION OF DRAWINGS

Like reference symbols in the various drawings indicate like elements.

DETAILED DESCRIPTION

Many publishers include content provided by third party content providers in publications under the publisher's control. For example, newspaper publishers include advertisements, called creatives, provided by advertisers, and syndicated columns provided by independent columnists. As another example, a website includes advertisement slots in one or more web pages of the website. The advertisement slots are purchased by advertisers, and an advertisement server system provides the advertisements for presentation on behalf of the advertisers. Display of an ad along with content provided by a content provider can be referred to as an ad impression or an ad placement.

In some implementations, an advertiser can establish an ad campaign. The ad campaign can make use of advertisement slots associated with multiple content providers. The advertiser can provide advertisements to be displayed with content provided by the content providers having associated advertisement slots included in the ad campaign. The ad campaign can have an ad campaign budget that indicates an amount that the advertiser is willing to spend on the ad campaign. In some implementations, the number of target users that an advertiser wishes to reach may be less than the total number of users associated with a content provider. For example, the advertiser may which to reach males between the ages of 25 and 35.

In some implementations, a number of target users reached for a particular content provider can be calculated based on a total number of target users associated with the content provider and a number of impressions purchased for the content provider in association with the ad campaign. This information can be used to determine a total number of impressions to purchase for each content provider included in the ad campaign in order to keep an effective cost per target user consistent across each content provider included in the ad campaign.

Figure 1:
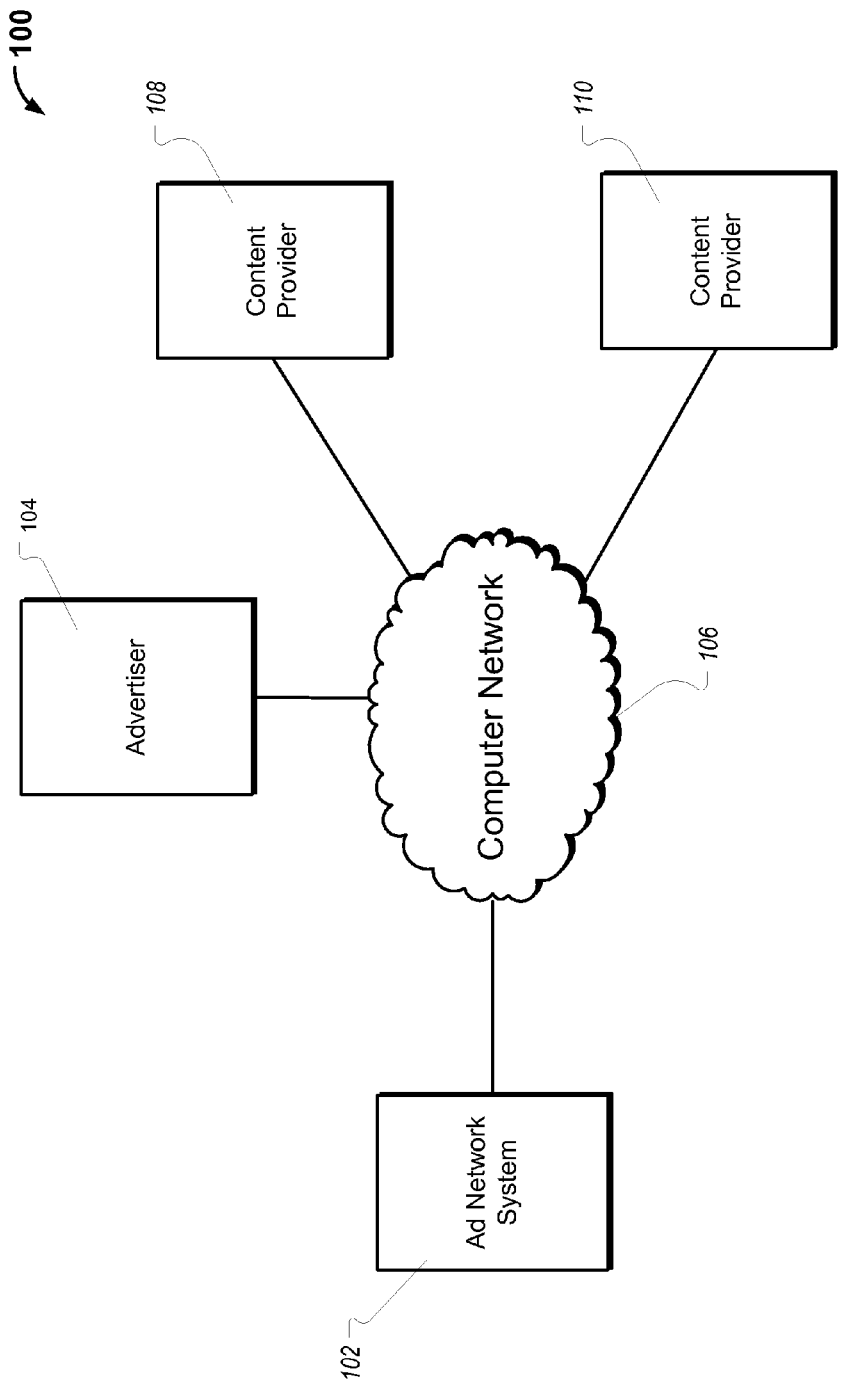
FIG. 1 is a block diagram of a system for selecting advertisement slots for an ad campaign.

Referring to FIG. 1, in an example system 100, an ad network system 102 provides ads to various content providers on behalf of an advertiser 104. The ad network system 102 can communicate with the advertiser 104 through a computer network 106 (e.g., the Internet, a LAN, or a WAN). The advertiser can provide the ads to the ad network system 102 (e.g., through the computer network 106), the ad network system 102 can create ads for the advertiser 104, or a third party can provide ads to the ad network system 102 on behalf of the advertiser 104.

The ad network system 102 can manage one or more ad campaigns for the advertiser 104. For example, the ad network system 102 can manage an ad campaign for a particular brand of golf shoe on behalf of the advertiser 104. In this example, the ad campaign can include content providers 108 and 110. The content providers 108 and 110 can be websites made up of one or more webpages. Ads provided by the ad network system 102 can be displayed alongside webpage content provided by the content providers 108 and 110. In some implementations, webpages provided by the content providers 108 and 110 can include advertisement slots that link back to the ad network system 102. An advertisement slot can include code that initiates an ad request that is sent to the ad network system 102. The ad network system 102 can then provide an ad to be displayed in the advertisement slot. For example, the ad network system 102 can provide a golf shoe ad associated with the advertiser 104 to be displayed in the advertisement slot alongside webpage content provided by the content provider 108 or the content provider 110.

In some implementations, the ad network system 102 can provide ads directly to the content providers 108 and 110. The content providers 108 and 110 can in turn integrate the ads into webpages that include web content prior to providing the webpages to end users.

In some implementations, the content providers 108 and 110 included in the ad campaign associated with the advertiser 104 can be selected so as to be relevant to one or more products being advertised by the ad campaign. For example, if the ad campaign is for a line of cooking utensils, a website related to cooking can be identified as being relevant to the ad campaign. The identified website can then be included in the ad campaign and ads for the cooking utensils can be provided to be displayed with web content provided by the cooking website. As another example, if the ad campaign is for a brand of gold shoe, websites that appeal to males between 30 and 60 years of age can be identified as being relevant to the ad campaign.

In some implementations, the ad network system 102 can identify content providers to include in an ad campaign for the advertiser 104. For this purpose, the ad network system 102 can provide the advertiser 104 with a user interface that allows the advertiser 104 to provide information that can be used to identify content providers to include in an ad campaign. This information may include, for example, location information, language information, demographic information, user interests, search keywords, and content provider category. Demographic information can include, for example, gender, age, education level, household income, marital status, and whether or not a user has children. For example, for an ad campaign for a brand of golf shoe, the advertiser 104 can indicate a desire to target males aged 35-54 who enter keywords of golf, golf shoes, or sporting equipment. The ad network system 102 can use this targeting information to identify websites that are popular with target users that match the targeting criteria provided by the advertiser 104.

In some implementations, the advertiser 104 can provide one or more ad formats for ads included in an advertising campaign. This can allow the ad network system 102 to identify content providers that publish content that is capable of displaying the indicated ad format types.

In some implementations, content providers can provide information about users (e.g., website visitors) to the ad network system 102. The ad network system 102 can use this information provided by the content providers to identify content providers that appeal to particular users. For example, the ad network system 102 can use the information provided by content providers to identify websites that appeal to single women in the age range of 25-34. As another example, the ad network system 102 can use the provided information to identify websites that are popular with dog owners over the age of 25 with a household income greater than $50,000 who live in the Cleveland, Ohio area. The identified websites can then be suggested for inclusion in an ad campaign for a dog walking service based out of Cleveland, Ohio.

In some implementations, the advertiser 104 can browse a list of suggested websites and select websites to include in an ad campaign. In association with the list, the ad network system 102 can provide information to the advertiser 104 on the number of users and number of target users reached by particular websites. This information can be used by the advertiser 104 to make informed decisions on which content providers to include in an ad campaign. In some implementations, the advertiser 104 can enter one or more additional websites to include in an ad campaign. In some implementations, the ad network system 102 can automatically suggest a number of websites to include in an ad campaign for the advertiser 104 based on targeting information provided by the advertiser.

Still referring to FIG. 1 and to the example described above, the advertiser 104 contracts with the ad network system 102 for an ad campaign for a brand of golf shoe. The ad network system 102 identifies the content providers 108 and 110 as relevant content providers to include in the ad campaign. In this example, the ad campaign is associated with a budget representing the amount of money that is to be spent on the campaign by the advertiser 104, and each of the content providers 108 and 110 is associated with an impression cost for purchasing impressions associated with the content providers 108 and 110. For example, the content provider 108 can charge $0.01 for each impression and the content provider 110 can charge $0.02 for each impression.

In some implementations, users of the content providers 108 and 110 (e.g., viewers of websites published by the content providers 108 and 110) may not all match targeting information provided by the advertiser 104. For example, the ad campaign for the golf shoe may be intended to target males between the ages of 35-54. In this example, this demographic may only make up 60% of the users associated with the content provider 108 and 47% of the users associated with content provider 110, with the remaining users of the content providers 108 and 110 not matching the specified targeting information. The users that match the targeting information (i.e., that fit within the target demographic) can be identified as target users.

In some implementations, not all of the impressions purchased by the advertiser 104 in association with the ad campaign will be viewed by target users. In such implementations, it can be desirable to determine a number of target users reached for the ad campaign for a given number of impressions purchased for each of the content providers 108 and 110. For example, the ad network system 102 can use information provided by the content providers 108 and 110 or received from other sources to identify a total number of users for each of the content providers 108 and 110 and a total number of target users for each of the content providers 108 and 110. This information can then be used to calculate a number of target users reached for a given number of impressions. In some implementations, a number of target users reached for a given number of impressions purchased can be calculated based on an assumption that each impression has an equal chance of reaching any particular user. In other words, each individual target user is just as likely to see an ad impression as each individual non-target user. In some implementations, a statistical model can be used to identify a number of target users reached. For example, the statistical model can assume that every impression has an equal chance of reaching any user of the content provider 108 or the content provider 110.

In one example, if the total number of users for the content provider 108 is U, the total number of target users for the content provider 108 is T, the total number of impressions purchased for the content provider 108 in association with the ad campaign is Imp, and the total number of target users reached for the content provider 108 is TUR(Imp), the total number of target users reached can be calculated using the following equation:

$$TUR(Imp) = T*(1-(1-1/U)^{Imp})$$

In this example, if the total number of users of the content provider 108 is 100,000, the total number of target users is 60,000, and the total number of impressions purchased is 10,000, the total number of target users reached is $60,000*(1-1-1/100,000)^{10,000}) = 5,710$.

A total number of target users reached also can be determined using other information. For example, some users associated with the content provider 108 may view more pages of the website provided by the content provider 108 or visit the website more often, therefore being exposed to more impressions than other users. This information can be collected and used to determine more accurate values of the total number of target users reached. As one example, user viewing behavior information can be used to produce one or more histograms that can be used to identify a number of target users reached.

For example, a histogram can be generated to show user behavior for the content provider 108 broken down by gender and age range. In this example, the histogram can be used to identify the number of page views made by males between the ages of 35-54 relative to other demographic categories in order to better identify a number of impressions viewed by males between the ages of 35-54 out of the total number of impressions for the content provider 108. This information can then be used to more accurately calculate a total number of target users reached (e.g., males between the ages of 35-54) for a given number of impressions purchased for the content provider 108 in association with an ad campaign.

As another example, collected user behavior information can indicate that 1,000,000 users of a website reach only one page, 500,000 users of the website reach two pages, and 200,000 users of the website reach three or more pages. This user behavior information can be broken down into various demographic categories and graphed in order to provide more accurate indications of target users reached.

A total number of target users reached (TUR) that is identified using a statistical model, histograms, equations, another method, or a combination of any of these methods can be used to determine an effective cost per user for a given content provider. In some implementations, if the total number of impressions purchased (Imp), the cost per impression (CPI), and number of target users reached (TUR) is known for a given content provider associated with an ad campaign, the effective cost per target user (ECPU) can be calculated using the following formula:

$$ECPU = Imp*CPI/TUR$$

Following the above example, where the total number of impressions purchased is 10,000, and the number of target users reached is 5,709, and assuming that the cost per impression is $0.02, the effective cost per target user is $10,000*0.02/5,709 = $0.035$.

In both the equation for calculating TUR, and the equation for calculating ECPU, as the number of impressions purchased in association with the ad campaign increases, both the number of target users reached and the effective cost per target user increases. It may be desirable to identify a number of impressions to purchase in order to achieve a certain effective cost per user for a content provider. To this end, a binary search can be performed in order to calculate the inverse of the above equation for ECPU. In other words, for a given effective cost per target user, determining the inverse of the above equation for ECPU can indicate a number of impressions to purchase. This function can be represented as:

$$\text{Impressions\_for\_ECPU(ECPU)}$$

In some implementations, the value of Impressions_for_ECPU(ECPU) can be determined using a method other than a binary search. For example, a mathematical inverse for the ECPU equation can be derived. To calculate Impressions_for_ECPU(ECPU) for a target ECPU value using a binary search, a first candidate value for a number of impressions to purchase (Imp) is selected and used to calculate an interim ECPU value. This first candidate value for Imp can be selected in a number of ways, including selecting the value arbitrarily (e.g., selecting a random first candidate value for Imp) or assigning a particular value (e.g., 10,000) as the first candidate value for Imp. The first candidate value for Imp also can be selected based on information associated with the ad campaign associated with the target ECPU or information associated with one or more other ad campaigns. For example, the first candidate value for Imp can be an average number of impressions purchased for advertising campaigns for similar products. As another example, the first candidate value for Imp can be an average number of impressions purchased for advertising campaigns that include one or more of the content providers included in the ad campaign associated with the target ECPU.

The calculated interim ECPU value can be compared to the target ECPU value. If the interim ECPU value is within a predetermined threshold (e.g., 0.001) of the target ECPU value, the first candidate value for Imp can be selected as the Impressions_for_ECPU(ECPU) value for the target ECPU. Thus, for example, if the target ECPU is 0.03 and the interim ECPU is 0.0308, the first candidate value for Imp can be selected as the Impressions_for_ECPU(ECPU) value when the threshold is 0.001. As another example, if the predetermined threshold is 0.1% and the interim ECPU is within 0.1% of the target ECPU, the first candidate value for Imp can be selected as the Impressions_for_ECPU(ECPU) value.

In some implementations, the predetermined threshold can be zero. In other words, such implementations require the interim ECPU to exactly match the target ECPU in order for the first candidate value for Imp to be selected as the Impressions_for_ECPU(ECPU) value.

If the interim ECPU is not within the predetermined threshold of the target ECPU, a second candidate value for Imp may be selected. If the interim ECPU is higher than the target ECPU, a lower value for Imp can be selected as the second candidate value for Imp. If the interim ECPU is lower than the target ECPU, a higher value for Imp can be selected as the second candidate value for Imp. The second candidate value for Imp can be used to identify a second interim ECPU as described above, and the second interim ECPU can be compared to the target ECPU to determine if the second interim ECPU is within the predetermined threshold of the target ECPU. If the second interim ECPU is within the predetermined threshold of the target ECPU, the second candidate value for Imp can be identified as the Impressions_for_ECPU (ECPU) value for the target ECPU. If the second interim ECPU is not within the predetermined threshold of the target ECPU, the iterative process of selecting a candidate value for Imp, calculating an interim ECPU, and comparing the calculated interim ECPU to the target ECPU is repeated until an interim ECPU is identified that is within the predetermined threshold of the target ECPU.

Thus, for example, if both the first and second interim ECPUs are greater than the target ECPU, a third candidate value for Imp is selected so as to be lower than the second candidate value for Imp. If both the first and second interim ECPUs are less than the target ECPU, a third candidate value for Imp can be selected so as to be greater than the second candidate value for Imp. If the first interim ECPU is greater than the target ECPU and second interim ECPU is less than the target ECPU, a third candidate value for Imp can be selected so as to be less than the first candidate value for Imp and greater than the second candidate value for Imp. This process of selecting subsequent candidate values for Imp can be extrapolated to narrow in on a candidate value for Imp that achieves an interim ECPU value that is within the predetermined threshold of the target ECPU. When an interim ECPU Is identified that is within a predetermined threshold of the target ECPU, the candidate value for Imp that is associated with the identified interim ECPU can be identified as the Impressions_for_ECPU(ECPU) for the target ECPU.

An Impressions_for_ECPU(ECPU) value can be identified for each content provider included in an ad campaign. For example, the ad network system 102 can identify Impressions_for_ECPU(ECPU) values for each of the content providers 108 and 110. The Impressions_for_ECPU (ECPU) for each of the content providers 108 and 110 can be multiplied by a cost per impression for each of the content providers 108 and 110 to calculate a total amount required to purchase a number of impressions corresponding to Impressions_for_ECPU(ECPU) from each content provider. The total cost of an ad campaign for a single content provider can be represented as TC(CP) and can be calculated as:

$$TC(CP)=CPI*\text{Impressions\_for\_ECPU(ECPU)}$$

For example, if the CPI for the content provider 110 is $0.01 and the Impressions_for_ECPU(ECPU) is 10,000, the cost of the advertising campaign for the content provider 110 is $100. The TC(CP) values for the content providers included in an ad campaign can be added up to calculate the total cost for the entire ad campaign. For example, the total cost of the ad campaign that includes the content providers 108 and 110 can be calculated by adding the TC(CP) values identified for each of the content providers 108 and 110. For example, if an ad campaign includes two content providers, CP1 and CP2, the total cost of an ad campaign (TC(AC)) can be calculated using the following equation:

$$TC(AC)=TC(CP1)+TC(CP2)$$

This equation can be represented in more general terms as:

$$TC(AC)=\Sigma TC(CP)$$

In some cases, it may be desirable to keep the effective cost per target user consistent across each content provider included in an ad campaign in order to ensure that money spent for the ad campaign is evenly distributed in order to reach the highest number of target users for a given budget. For this purpose, an ideal ECPU can be identified that is constant across each content provider in an ad campaign and leads to a total ad campaign cost that is within a predetermined threshold of an ad campaign budget for the ad campaign.

In some implementations, the ideal ECPU can be calculated using a binary search. To calculate an ideal ECPU in order to achieve a target ad campaign budget using a binary search, a first candidate ECPU can be selected. The first candidate ECPU can be selected in a number of ways. For example, the first candidate ECPU can be selected arbitrarily such as by using a random number generator to select the first candidate ECPU. As another example, the same value (e.g., 0.10) can always be used as the first candidate ECPU. As yet another example, the first candidate ECPU can be selected based on information associated with the ad campaign or information associated with one or more other ad campaigns. For example, the first candidate ECPU can be an average ECPU for advertising campaigns for similar products. As another example, the first candidate ECPU can be an average ECPU for advertising campaigns that include one or more of the content providers included in the ad campaign associated with the target ad campaign budget.

The first candidate ECPU can be used to identify an Impressions_for_ECPU(ECPU) value for each content provider included in the ad campaign. The Impressions_for_ECPU(ECPU) value for each content provider can be calculated using a binary search as described above, or using another method. For example, a mathematical inverse of the combination of the above listed equations for calculating ECPU and TUR(I) can be derived.

The Impressions_for_ECPU(ECPU) values identified for each content provider for the first candidate ECPU can be used to calculate TC(CP) values for each content provider, and these TC(CP) values can be summed to identify an interim TC(AC) for the ad campaign based on the first candidate ECPU. The calculated interim TC(AC) can be compared to the target ad campaign budget for the ad campaign to determine if the calculated interim TC(AC) is within a predetermined threshold of the target ad campaign budget. The predetermined threshold can be, for example, a percentage of the target ad campaign budget, a set dollar amount, or zero. If the calculated interim TC(AC) is within the predetermined threshold of the target ad campaign budget, the first candidate ECPU may be identified as the ideal ECPU for the ad campaign.

If the calculated interim TC(AC) is not within the predetermined threshold of the target ad campaign budget, a second candidate ECPU may be selected based on the comparison between the calculated interim TC(AC) and the target ad campaign budget. If the calculated interim TC(AC) is greater than the target ad campaign budget, a lower ECPU can be selected as the second candidate ECPU. If the calculated interim TC(AC) is lower than the target ad campaign budget, a higher ECPU can be selected as the second candidate ECPU. The second candidate ECPU can be used to identify a second calculated interim TC(AC) as described above, and the second calculated interim TC(AC) can be compared to the target ad campaign budget to determine if the second calculated interim TC(AC) is within the predetermined threshold of the target ad campaign budget.

If the second calculated interim TC(AC) is within the predetermined threshold of the target ad campaign budget, the second candidate ECPU can be identified as the ideal ECPU. If the second calculated interim TC(AC) is not within the predetermined threshold of the target ad campaign budget, the iterative process of selecting a candidate ECPU, calculating an interim TC(AC), and comparing the calculated interim TC(AC) to the target ad campaign budget is repeated until a calculated interim TC(AC) is identified that is within the predetermined threshold of the target ad campaign budget. When a calculated interim TC(AC) that is within the predetermined threshold of the target ad campaign budget is identified, the candidate ECPU associated with the calculated interim TC(AC) is identified as the ideal ECPU for the ad campaign.

According to the iterative process, if both the first and second calculated interim TC(AC)s are greater than the target ad campaign budget, a third candidate ECPU is selected so as to be lower than the second candidate ECPU. If both the first and second calculated interim TC(AC)s are less than the target ad campaign budget, a third candidate ECPU can be selected so as to be greater than the second candidate ECPU. If the first calculated interim TC(AC) is greater than the target ad campaign budget and second calculated interim TC(AC) is less than the target ad campaign budget, a third candidate ECPU can be selected so as to be less than the first candidate ECPU and greater than the second candidate ECPU. This process of selecting subsequent candidate ECPU values can be extrapolated to narrow in on a candidate ECPU that achieves a calculated interim TC(AC) value that is within the predetermined threshold of the target ad campaign budget. This identified candidate ECPU can then be selected as the ideal ECPU for the target ad campaign budget.

Alternative methods also can be used to identify an ideal ECPU. For example, a mathematical inverse of the equation for calculating TC(AP) can be derived in order to calculate an ideal ECPU.

An identified ideal ECPU for a target ad campaign budget can be used to determine a number of impressions to purchase for each content provider included in the ad campaign in order to achieve the target ad campaign budget and the ideal ECPU. The number of impressions to purchase for each content provider for the ideal ECPU can be calculated as described above (e.g., using a binary search, or a mathematically derived inverse function).

The identified ECPU and numbers of impressions to purchase for each content provider in an ad campaign can be provided to an advertiser. The advertiser can then use the provided information to determine if the suggested number of impressions should be purchased for the ad campaign. For example, the ad network system 102 can identify an ideal ECPU and number of impressions to buy for each of the content providers 108 and 110 for the an ad campaign budget provided by the advertiser 104, and can provide the identified values to the advertiser 104. The advertiser 104 can then elect to purchase or not purchase the suggested numbers of impressions from the content providers 108 and 110. In some implementations, the ad network system 102 can automatically purchase a number of impressions identified for each of the content providers 108 and 110 to achieve an ideal ECPU for an ad campaign budget provided by the advertiser 104. For example, the advertiser 104 can instruct the ad network system 102 to identify an ideal ECPU for a given ad campaign budget and purchase a number of impressions from each of the content providers 108 and 110 to achieve the ideal ECPU on behalf of the advertiser 104.

Figure 2:
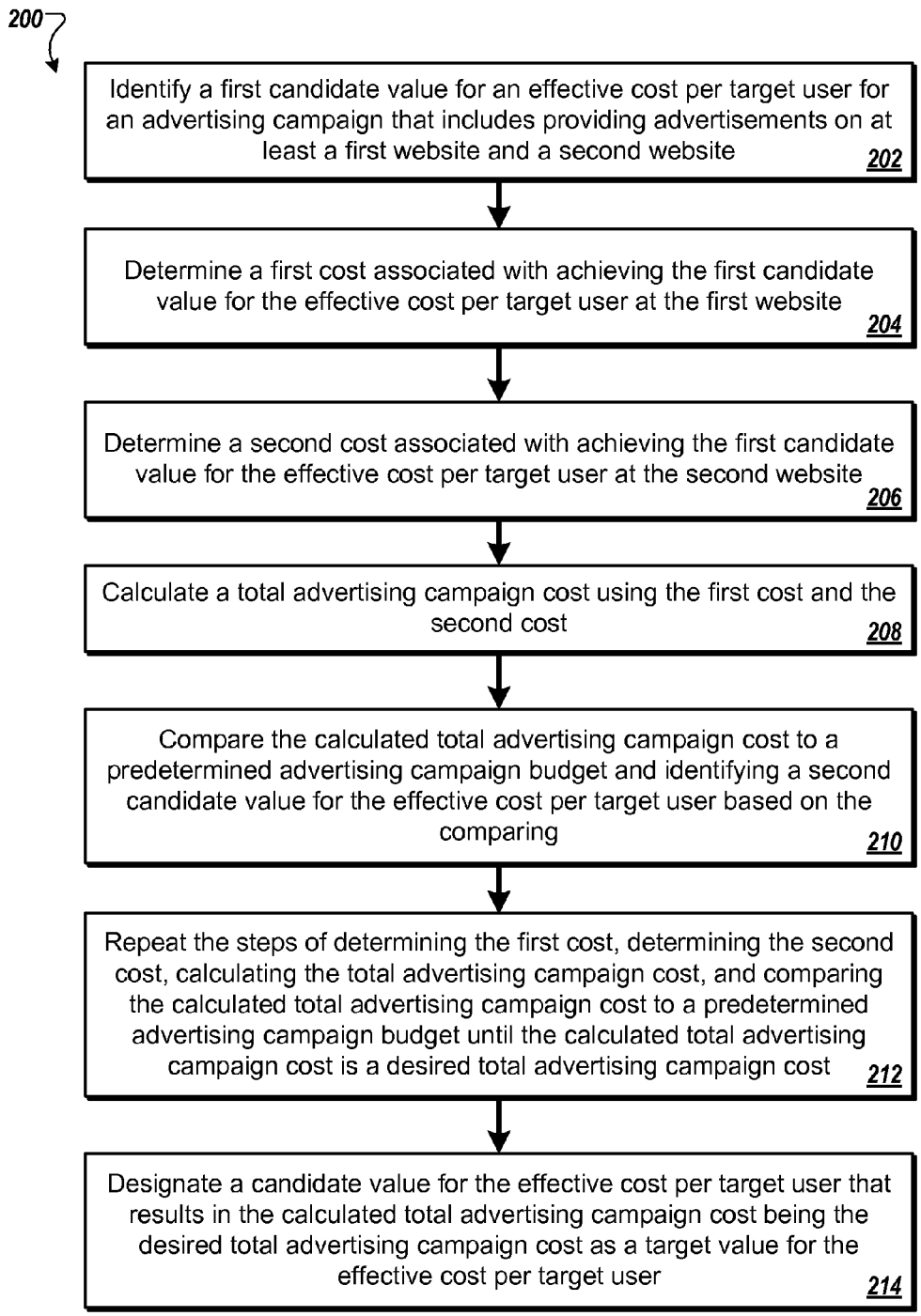
FIG. 2 is a flow diagram illustrating a process for determining an effective cost per target user for an ad campaign.

Referring now to FIG. 2, a process 200 for determining an effective cost per target user for an ad campaign includes identifying a first candidate value for an effective cost per target user for an advertising campaign that includes providing advertisements on at least a first website and a second website (202). For example, the ad campaign can include a first website provided by the content provider 108 of FIG. 1 and a second website provided by the content provider 110 of FIG. 2. The ad campaign also can include additional websites.

The first candidate value for an effective cost per target user (ECPU) can be selected based on information associated with the ad campaign or with one or more other ad campaigns. For example, the first candidate ECPU can be an average ECPU for ad campaigns for similar products. As another example, the first candidate ECPU can be an average ECPU for ad campaigns that include one or more of the content providers included in the ad campaign associated with the target ad campaign budget. As other examples, the first candidate ECPU can be an average ECPU for all ad campaigns managed by a particular advertising network system (e.g., the ad network system 102 of FIG. 1), or an average ECPU for all ad campaigns associated with a particular advertiser (e.g., the advertiser 104 of FIG. 1).

The first candidate ECPU can be selected arbitrarily using, for example, a random number generator, or, in a different approach, the same value (e.g., 0.08) can always be used as the first candidate ECPU.

A first cost associated with achieving the first candidate value for the effective cost per target user at the first website can be determined (204). For example, the total cost of an ad campaign for a the first website (TC(CP)) can be calculated for the first candidate ECPU as described above with reference to FIG. 1. Calculating the TC(CP) for the first website may include identifying a number of impressions to purchase for the first website in order to achieve the first candidate ECPU. The identified number of impressions to purchase for the first website can then be used to calculate the TC(CP) for the first website as described above with reference to FIG. 1.

Identifying a number of impressions to purchase for the first website can include identifying a cost per impression for the first website and identifying a number of target users associated with the first website. The number of impressions to purchase for the first website can be identified using a binary search as described above with reference to FIG. 1. In another approach, an inverse of an equation for calculating ECPU based on a number of impressions purchased can be mathematically derived, and this derived equation then can be used to identify a number of impressions to purchase for the first website in order to achieve the first candidate ECPU.

A second cost associated with achieving the first candidate value for the effective cost per target user at the second website can be determined (206). In some implementations, the second cost associated with the second website can be determined in the same manner as the first cost associated with the first website. For example, the total cost of an ad campaign for a the second website (TC(CP)) can be calculated for the first candidate ECPU as described above with reference to FIG. 1. In some implementations, calculating the TC(CP) for the second website includes identifying a number of impressions to purchase for the second website in order to achieve the first candidate ECPU. The identified number of impressions to purchase for the second website can then be used to calculate the TC(CP) for the second website as described above with reference to FIG. 1.

A total advertising campaign cost can be calculated using the first cost and the second cost (208). For example, the TC(CP) values calculated for each of the first and second web sites can be added together to calculate a total cost of an ad campaign (TC(AC)). Additional TC(CP) values for other web sites included in the ad campaign can be used in calculating the total ad campaign cost.

The calculated total advertising campaign cost can be compared to a predetermined advertising campaign budget and a second candidate value for the effective cost per target user can be identified based on the comparing (210). For example, the calculated total ad campaign cost can be compared to the ad campaign budget to determine if the calculated total ad campaign cost is within a predetermined threshold of the ad campaign budget. The predetermined threshold can be, for example, a percentage of the ad campaign budget or a set dollar amount. In some implementations, the predetermined threshold can be zero.

If it is determined that the calculated total ad campaign cost is not within the predetermined threshold of the ad campaign budget, a second candidate value for the effective cost per target user (ECPU) can be identified by comparing of the ad campaign budget and the calculated total ad campaign cost. If the calculated total ad campaign cost is greater than the ad campaign budget, a lower ECPU can be selected as the second candidate ECPU. If the calculated total ad campaign cost is lower than the ad campaign budget, a higher ECPU can be selected as the second candidate ECPU.

The steps of determining the first cost, determining the second cost, calculating the total advertising campaign cost, and comparing the calculated total advertising campaign cost to a predetermined advertising campaign budget can be repeated until the calculated total advertising campaign cost is a desired total advertising campaign cost (212). For example, the second candidate ECPU identified at stage 210 can be used to identify updated first and second costs associated with the first and second websites. The updated first and second costs can be used to calculate a second calculated total ad campaign cost as described above and the second calculated total ad campaign cost can be compared to the ad campaign budget. The comparing of the second calculated total ad campaign cost to the ad campaign budget can include determining if the second calculated total ad campaign cost is within a predetermined threshold of the ad campaign budget.

If the second calculated total ad campaign cost is within the predetermined threshold of the ad campaign budget, the second candidate ECPU can be identified as the ideal ECPU. If the second calculated total ad campaign cost is not within the predetermined threshold of the ad campaign budget, the steps of determining the first cost, determining the second cost, calculating the total advertising campaign cost, and comparing the calculated total advertising campaign cost to a predetermined advertising campaign budget can be repeated.

If both the first and second calculated total ad campaign costs are greater than the ad campaign budget, a third candidate ECPU is selected so as to be lower than the second candidate ECPU. If both the first and second calculated total ad campaign costs are less than the ad campaign budget, a third candidate ECPU can be selected so as to be greater than the second candidate ECPU. If the first calculated total ad campaign cost is greater than the ad campaign budget and second calculated total ad campaign cost is less than the ad campaign budget, a third candidate ECPU can be selected so as to be less than the first candidate ECPU and greater than the second candidate ECPU. This process of selecting subsequent candidate ECPU values can be extrapolated to narrow in on a candidate ECPU that achieves a calculated total ad campaign cost value that matches the ad campaign budget or is within a predetermined threshold of the ad campaign budget.

A candidate value for the effective cost per target user that results in the calculated total advertising campaign cost being the desired total advertising campaign cost can be designated as a target value for the effective cost per target user (214). For example, if a calculated total ad campaign cost that matches the ad campaign budget or is within a predetermined threshold of the ad campaign budget is identified, the candidate ECPU associated with the calculated total ad campaign cost can be identified as the target ECPU for the ad campaign.

In some implementations, more or fewer steps of the process 200 can be performed. For example, designating a candidate value for the effective cost per target user as a target value for the effective cost per target user (214) can be omitted from the process. As another example, a step of using a cost per impression for the first website and a number of target users associated with the first website to determine a number of impressions to purchase in order to achieve the identified candidate value for the effective cost per target user for the first website can be added to the process 200. Two or more of the steps can be performed in a different order.

Figure 3:
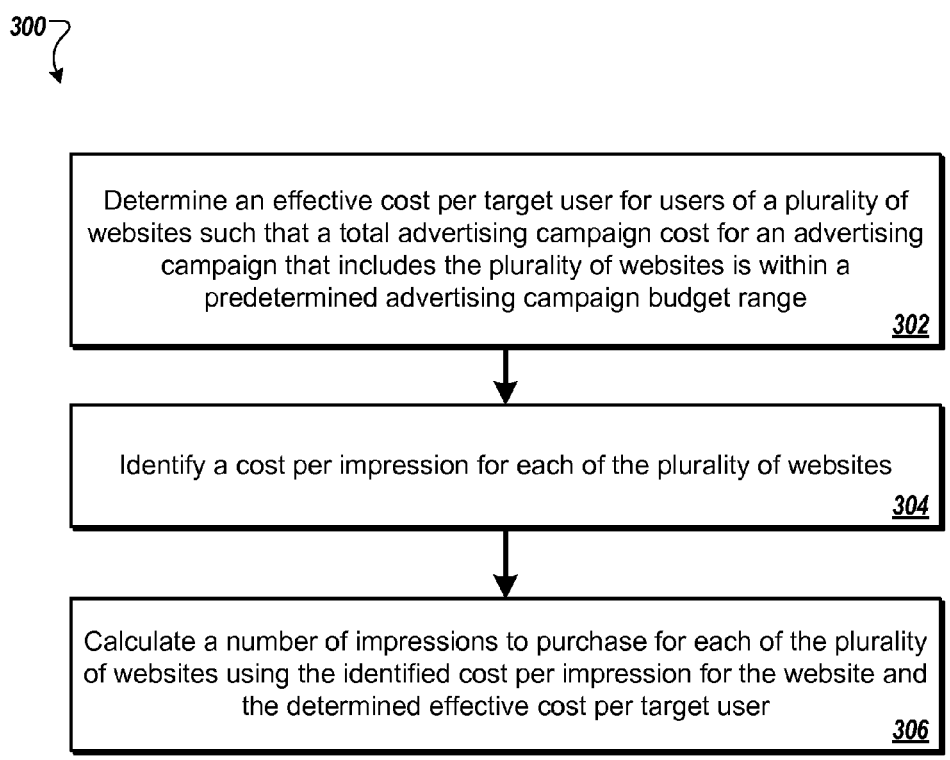
FIG. 3 is a flow diagram illustrating a process for determining a number of impressions to purchase for each of a plurality of websites included in an ad campaign.

Referring now to FIG. 3, a process 300 for determining a number of impressions to purchase for each of a plurality of websites included in an ad campaign includes determining an effective cost per target user for users of a set of websites such that a total advertising campaign cost for an advertising campaign that includes the set of websites is within a predetermined advertising campaign budget range. For example, referring to FIG. 1, the ad network system 102 can determine an effective cost per target user for users of websites published by the content providers 108 and 110. The ad network system 102 can identify the ECPU for an ad campaign associated with the advertiser 104. The ECPU can be selected so that a total cost for the ad campaign is within a predetermined threshold of a budget indicated by the advertiser 104.

Determining an ECPU can include performing an iterative process that includes selecting an initial ECPU, determining an interim number of impressions to purchase for each of the websites to achieve the initial ECPU, calculating a total ad campaign cost using the interim number of impressions to purchase, and comparing that the calculated total ad campaign cost is not within the predetermined ad campaign budget. In some implementations, an ECPU can be determined using one of the previously described methods for identifying an ECPU.

A cost per impression for each of the websites can be identified (304). For example, referring to FIG. 1, the content provider 108 can indicate a cost of $0.03 for each impression associated with a website published by the content provider 108 and the content provider 110 can indicate a cost of $0.01 for each impression associated with a website published by the content provider 110. In some implementations, an ad network system (e.g., the ad network system 102 of FIG. 1) can negotiate with website publishers to achieve lower costs per impression.

A number of impressions to purchase for each of the websites can be calculated using the identified cost per impression for the website and the determined effective cost per target user. For example, a binary search can be performed to calculate a number of impressions to purchase in order to achieve the determined ECPU. As another example, an iterative process can be performed to calculate the number of impressions to purchase. The iterative process can include steps of selecting an initial value for a number of impressions to purchase, calculating an interim ECPU using the initial value for the number of impressions to purchase, and comparing the interim ECPU to the previously determined ECPU. Calculating a number of impressions to purchase can include deriving a mathematical inverse of an equation for calculating ECPU and using the derived mathematical inverse to calculate the number of impressions to purchase.

In some implementations, more or fewer steps of the process 300 can be performed. For example, steps of receiving targeting information and using the received targeting information to identify the plurality of websites can be added to the process 300. In addition, two or more steps can be performed in a different order. For example, the step of identifying a cost per impression for each of the plurality of websites can be performed before the step of determining an effective cost per target user for users of the plurality of websites.

Figure 4:
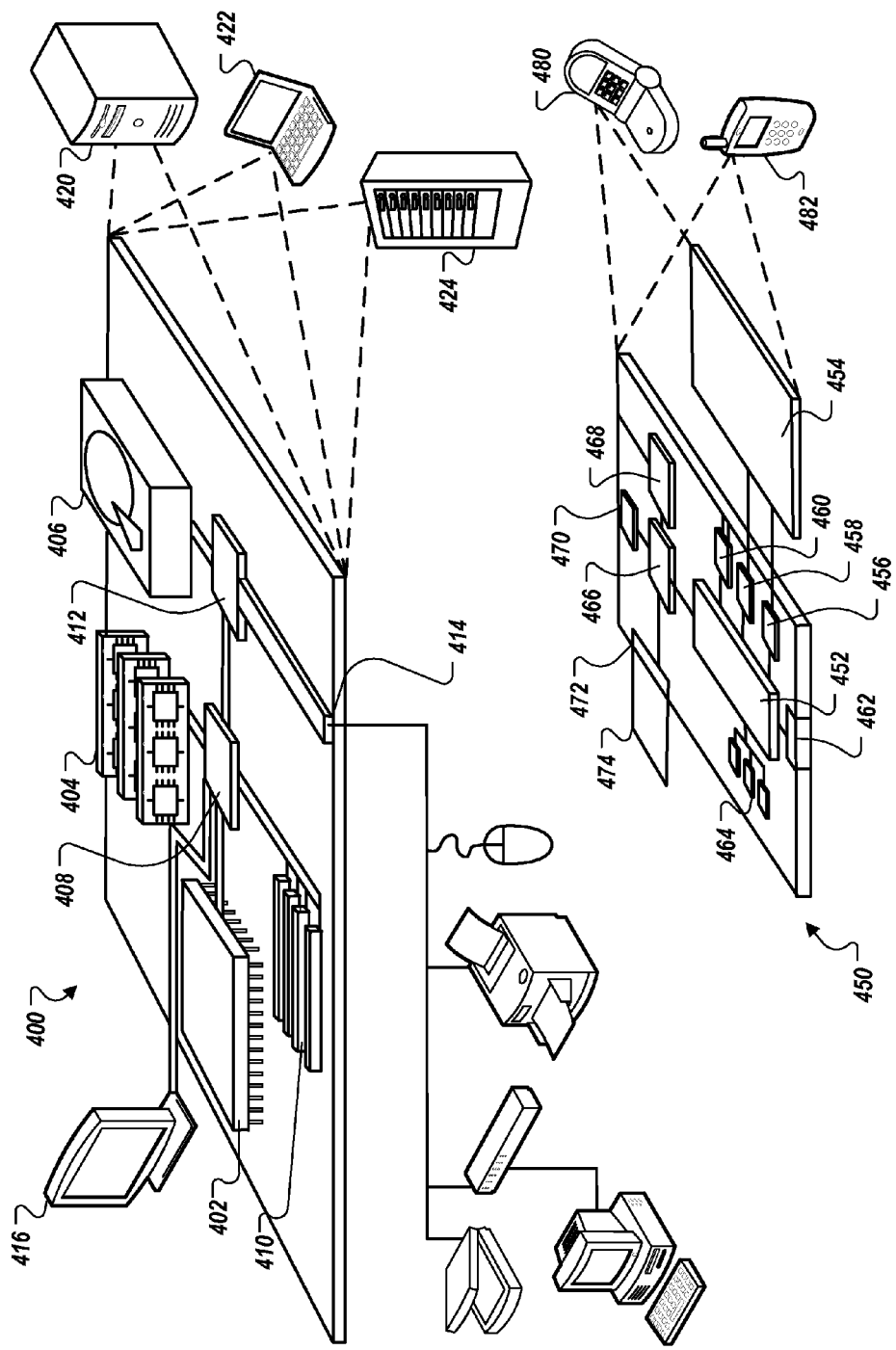
FIG. 4 shows an example of a computing device and a mobile computing device that can be used in connection with computer-implemented methods and systems described in this document.

FIG. 4 shows an example of a computing device 400 and a mobile computing device that can be used to implement the techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

The invention claimed is:

1. A computer-implemented method to be performed by one or more processors, the method comprising:
   identifying a first candidate value for an effective cost per target user for an advertising campaign that includes providing advertisements on at least a first website and a second website;
   determining a first cost associated with achieving the first candidate value for the effective cost per target user at the first website;
   determining a second cost associated with achieving the first candidate value for the effective cost per target user at the second website;
   calculating, using the one or more processors, a total advertising campaign cost using the first cost and the second cost;
   comparing the calculated total advertising campaign cost to a predetermined advertising campaign budget and identifying a second candidate value for the effective cost per target user based on the comparing;
   repeating the steps of determining the first cost, determining the second cost, calculating the total advertising campaign cost, and comparing the calculated total advertising campaign cost to a predetermined advertising campaign budget until the calculated total advertising campaign cost is a desired total advertising campaign cost; and
   designating a candidate value for the effective cost per target user that results in the calculated total advertising campaign cost being the desired total advertising campaign cost as a target value for the effective cost per target user.

2. The method of claim 1, wherein determining the first cost associated with achieving the first candidate value for the effective cost per target user at the first website comprises:
   identifying a cost per impression for the first website;
   identifying a number of target users associated with the first website;
   using the cost per impression for the first website and the number of target users associated with the first website to determine a number of impressions to purchase in order to achieve the identified candidate value for the effective cost per target user; and
   determining the first cost using the determined number of impressions to purchase and the cost per impression for the first website.

3. The method of claim 2, wherein determining the number of impressions to purchase includes performing a binary search to identify the number of impressions to purchase to achieve the identified candidate value for the effective cost per target user, using the identified number of target users.

4. The method of claim 2, wherein determining the number of impressions to purchase includes performing an iterative process, wherein the iterative process includes:
   selecting an initial candidate value for the number of impressions to purchase;
   calculating, using the one or more processors, an interim value for the effective cost per target user using the initial candidate value for the number of impressions to purchase;
   determining that the interim value for the effective cost per target user is not within a predetermined range of the candidate value for the effective cost per target user; and
   identifying a second candidate value for the number of impressions to purchase responsive to the determining.

5. The method of claim 4, wherein calculating the interim value for the effective cost per target user includes calculating, using the one or more processors, a number of target users reached for the candidate value for the number of impressions to purchase, using the candidate value for the number of impressions to purchase, the number of target users associated with the first website, and a total number of users associated with the first website.

6. The method of claim 5, wherein calculating the number of target users reached for the candidate value for the number of impressions to purchase includes calculating, using the one or more processors, the probability of an individual user seeing at least one impression of a number of impressions equal to the candidate value for the number of impressions to purchase, using the total number of users associated with the first website and the candidate value for the number of impressions to purchase, based on an assumption that each user of the website is equally likely to see a particular advertisement impression, and multiplying the probability by the number of target users associated with the first website.

7. The method of claim 4, wherein calculating the interim value for the effective cost per target user includes identifying a number of target users reached for the candidate value for the number of impressions to purchase using one or more histograms of user behavior.

8. The method of claim 2, further comprising:
   receiving targeting information to be used in identifying target users from an advertiser; and
   using the received targeting information to identify target users for the first website.

9. The method of claim 1, wherein identifying the first candidate value for the effective cost per target user includes selecting an arbitrary first candidate value.

10. The method of claim 1, identifying the first candidate value for the effective cost per target user includes identifying an average cost per target user for one or more advertising campaigns.

11. The method of claim 1, wherein the desired total advertising campaign cost is within a predetermined range of the predetermined advertising campaign budget.

12. The method of claim 1, wherein calculating a total advertising campaign cost includes calculating, using the one or more processors, a total advertising campaign cost for an advertising campaign that includes the first website, the second website and one or more additional websites.

13. The method of claim 12, wherein the target value for the effective cost per target user is the same for each website included in the advertising campaign.

14. A computer-implemented method to be performed by one or more processors, the method comprising:
    determining an effective cost per target user for users of a plurality of websites such that a total advertising campaign cost for an advertising campaign that includes the plurality of websites is within a predetermined advertising campaign budget range, where the number of target users for each of the plurality of websites is less than the total number of users for the website, and the effective cost per target user is consistent across the plurality of websites;
    identifying a cost per impression for each of the plurality of websites; and
    calculating, using the one or more processors, a number of impressions to purchase for each of the plurality of websites using the identified cost per impression for the website and the determined effective cost per target user.

15. The method of claim 14, wherein determining the effective cost per target user includes performing a binary search to identify the effective cost per target user.

16. The method of claim 14, wherein determining the effective cost per target user includes performing an iterative process, wherein the iterative process includes:
    selecting an initial candidate value for the effective cost per target user;
    determining an interim number of impressions to purchase for each of the plurality of websites in order to achieve the candidate value for the effective cost per target;
    calculating, using the one or more processors, the total advertising campaign cost using the interim number of impressions to purchase and the identified cost per impression for each of the plurality of websites;
    determining that the calculated total advertising campaign cost is not within the predetermined advertising campaign budget range; and
    identifying a second candidate value for the effective cost per target user responsive to the determining.

17. The method of claim 16, wherein selecting an initial candidate value for the effective cost per target user includes identifying an average cost per target user for one or more advertising campaigns.

18. The method of claim 14, wherein calculating the number of impressions to purchase for each of the plurality of websites includes performing a binary search to identify the number of impressions to purchase to achieve the effective cost per target user, given a predetermined number of target users associated with each of the plurality of websites.

19. The method of claim 14, wherein calculating the number of impressions to purchase for each of the plurality of websites includes performing an iterative process, wherein the iterative process includes:
    selecting an initial candidate value for the number of impressions to purchase;
    calculating, using the one or more processors, an interim value for the effective cost per target user using the initial candidate value for the number of impressions to purchase;
    determining that the interim value for the effective cost per target user is not within a predetermined range of the determined actual effective cost per target user; and
    identifying a second candidate value for the number of impressions to purchase responsive to the determining.

20. The method of claim 14, further comprising:
    receiving targeting information from an advertiser; and
    using the received targeting information to identify the plurality of websites.

21. The method of claim 20, further comprising:
    using the received targeting information to identify the number of target users for each of the plurality of websites.

22. A computer-implemented method to be performed by one or more processors, the method comprising:
    identifying a total number of users of a website for a first time period;
    determining criteria for identifying target users of the website;
    identifying a total number of target users for the website, using the determined criteria, for the first time period;
    identifying a cost per impression associated with the website; and
    iteratively identifying a number of advertisement impressions in association with the website until an effective cost per target user associated with the number of advertisement impressions is within a specified range of a target effective cost per target user, wherein the effective cost per target user is determined by:
        determining a number of target users reached for the number of advertisement impressions by calculating, using the one or more processors, the probability of an individual user seeing at least one advertisement impression of the identified number of advertisement impressions using the total number of users and the number of advertisement impressions, based on an assumption that each user of the website is equally likely to see a particular advertisement impression, and multiplying the probability by the total number of target users for the website;
        using the determined number of target users reached, the cost per impression, and the number of advertisement impressions to determine the effective cost per target user for the number of advertisement impressions; and
        comparing the effective cost per target user to the target effective cost per target user to determine whether the effective cost per target user is within the specified range of the target effective cost per target user.

* * * * *